United States Patent
Noda

(10) Patent No.: US 12,512,883 B2
(45) Date of Patent: Dec. 30, 2025

(54) RECEPTION DEVICE, COMMUNICATION SYSTEM, RECEPTION METHOD, AND CONTROL CIRCUIT

(71) Applicant: Mitsubishi Electric Corporation, Tokyo (JP)

(72) Inventor: Yasunori Noda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 125 days.

(21) Appl. No.: 18/137,573

(22) Filed: Apr. 21, 2023

(65) Prior Publication Data

US 2023/0299818 A1 Sep. 21, 2023

Related U.S. Application Data

(63) Continuation of application No. PCT/JP2020/042626, filed on Nov. 16, 2020.

(51) Int. Cl.
H04B 7/0456 (2017.01)
H04B 7/0426 (2017.01)

(52) U.S. Cl.
CPC .......... *H04B 7/0456* (2013.01); *H04B 7/043* (2013.01)

(58) Field of Classification Search
CPC .............................. H04B 7/0456; H04B 7/043
USPC ....................................................... 375/262
See application file for complete search history.

(56) References Cited

U.S. PATENT DOCUMENTS

| | | | |
|---|---|---|---|
| 7,778,338 B2 * | 8/2010 | Ma | H04L 5/0026 375/350 |
| 2008/0063012 A1 * | 3/2008 | Nakao | H04L 27/2657 370/500 |
| 2009/0191831 A1 | 7/2009 | Sasaki et al. | |
| 2013/0094490 A1 | 4/2013 | Taromaru et al. | |

(Continued)

FOREIGN PATENT DOCUMENTS

| | | |
|---|---|---|
| JP | 2008-103961 A | 5/2008 |
| JP | 2008-311911 A | 12/2008 |
| JP | 2013-90012 A | 5/2013 |

(Continued)

OTHER PUBLICATIONS

Shunsuke Uehashi et al., "Performance Evaluation of a Successive Interference Cancellation Scheme Dealing with Asynchronous Signal Collision in Space-based AIS" Teice Technical Report RCS2017-150, pp. 43-48, Aug. 2017.

*Primary Examiner* — Leila Malek
(74) *Attorney, Agent, or Firm* — Birch, Stewart, Kolasch & Birch, LLP

(57) ABSTRACT

A reception device receives, by a plurality of antennas, signals in which a plurality of radio signals are superimposed, the reception device including: a weight generation unit that generates a weight for beamforming in order to improve reception quality of a desired signal, which is one of the plurality of the radio signals, on the basis of a reception timing and a frequency of the signals received individually by the antennas; a weight correction unit that performs correction, on the weight, in order to compensate for a Doppler shift between the signals received individually by the antennas on the basis of the frequency of the signals received individually by the antennas; and a combining unit that combines the signals received individually by the antennas using the weight obtained after the correction.

10 Claims, 6 Drawing Sheets

(56) References Cited

U.S. PATENT DOCUMENTS

2019/0028309 A1* 1/2019 Noda .................... G01S 13/876

FOREIGN PATENT DOCUMENTS

| WO | WO 2007/113902 A1 | 10/2007 |
|---|---|---|
| WO | WO 2017/145215 A1 | 8/2017 |

* cited by examiner

RECEPTION DEVICE, COMMUNICATION SYSTEM, RECEPTION METHOD, AND CONTROL CIRCUIT

CROSS-REFERENCE TO RELATED APPLICATION

This application is a continuation application of International Application PCT/JP2020/042626, filed on Nov. 16, 2020, and designating the U.S., the entire contents of which are incorporated herein by reference.

BACKGROUND OF THE INVENTION

1. Field of the Invention

The present disclosure relates to a reception device that uses a plurality of antennas to receive signals in which a plurality of signals are superimposed, a communication system, a reception method, and a control circuit.

2. Description of the Related Art

A wireless communication system accommodates a plurality of channels for transmitted/received signals by multiplexing the channels in time, code, or frequency. Moreover, as represented by a wireless LAN or the like, transmission devices avoid transmission collision on the basis of carrier sensing or the like.

Generally, a reception device in the wireless communication system that aims to properly perform demodulation needs to perform, on a received waveform, automatic frequency control (AFC) for carrier frequency synchronization, symbol timing synchronization for time synchronization, frame timing synchronization, or the like.

Here, in a case where data is asynchronous between the transmission devices or where carrier sensing is not established therebetween, the above techniques do not work well so that the reception device receives waveforms interfering with each other. When interference occurs between signals transmitted from different transmission devices, wireless communication can use, as a reception technique, a scheme that removes a signal by some filtering (including beamforming) or a scheme that performs interference cancellation represented by successive interference cancellation (SIC) used for Bell Laboratories layered space-time (BLAST) or the like in multiple-input multiple-output (MIMO).

Non Patent Literature 1, Uehashi, et al. "Performance Evaluation of a Successive Interference Cancellation Scheme Dealing with Asynchronous Signal Collision in Space-based AIS", IEICE Technical Report RCS2017-150, discloses a technique for improving communication quality by eliminating interference of asynchronously colliding signals by SIC.

However, the technique described in Non Patent Literature 1 is premised on reception with a single antenna, and does not disclose a method of combining a plurality of signals received by a plurality of antennas, particularly, antennas included in different mobile bodies. In SIC where a plurality of received signals to be demodulated need to have differences in received power, if a plurality of beams are appropriately combined, a plurality of received signals having different received powers can be generated so that one can expect an increase in the number of signals that can be demodulated. Here, in a case where reception devices that receive signals at different receiving positions are used, different Doppler shift and delay are added to a received signal in each propagation path from each transmission device to each receiving position, whereby the influences thereof need to be removed. In particular, in a case where a static beamforming weight is used, there is a problem in that a received signal to noise ratio (SNR) varies with time like fading due to a phase that varies with time depending on a Doppler frequency, and communication quality is degraded.

SUMMARY OF THE INVENTION

To solve the problem, the present disclosure is a reception device that receives, by a plurality of antennas, signals in which a plurality of radio signals are superimposed. The reception device includes: a weight generation unit to generate a weight for beamforming in order to improve reception quality of a desired signal, which is one of the plurality of the radio signals, on the basis of a reception timing and a frequency of the signals received individually by the antennas; a weight correction unit to perform correction, on the weight, in order to compensate for a Doppler shift between the signals received individually by the antennas on the basis of the frequency of the signals received individually by the antennas; and a combining unit to combine the signals received individually by the antennas using the weight obtained after the correction.

DETAILED DESCRIPTION OF THE PREFERRED EMBODIMENTS

Hereinafter, a reception device, a communication system, a reception method, and a control circuit according to embodiments of the present disclosure will be described in detail with reference to the drawings.

First Embodiment

Figure 1:
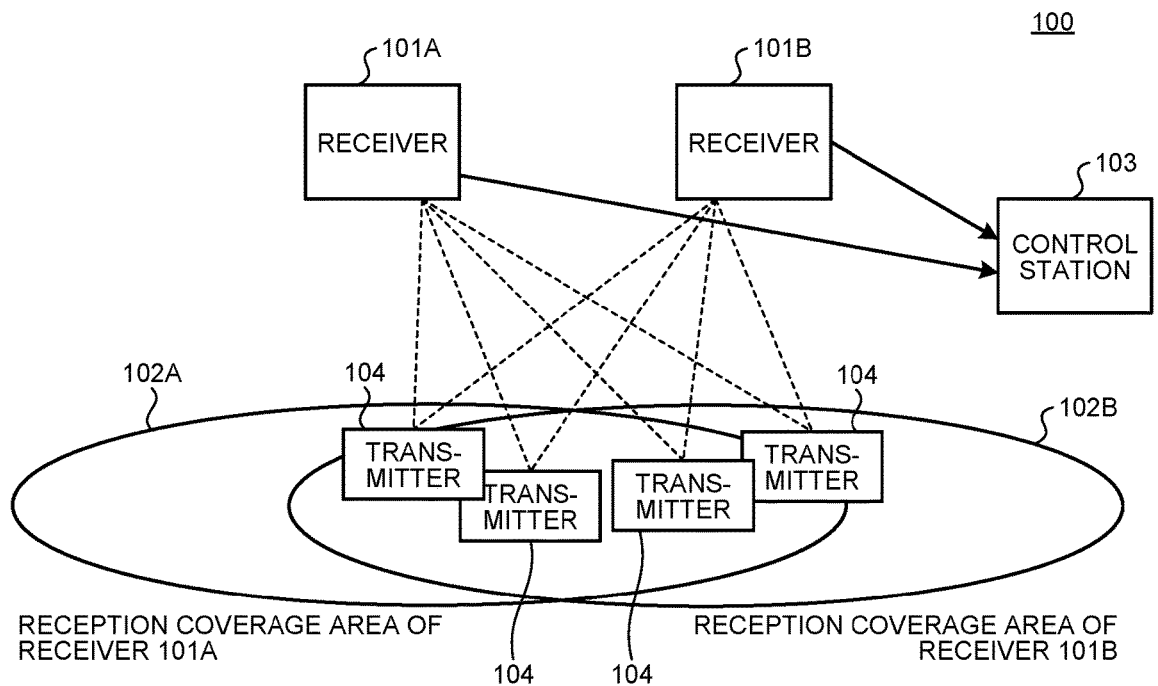
FIG. 1 is a diagram illustrating an example of a communication system to which a reception device according to a first embodiment is applied.

FIG. 1 is a diagram illustrating an example of a communication system to which a reception device according to a first embodiment is applied.

A communication system 100 illustrated in FIG. 1 includes receivers 101A and 101B and a control station 103.

The receivers 101A and 101B receive radio signals, which are transmitted from transmitters 104 present in respective reception coverage areas, by antennas not illustrated. In the communication system 100, a reception coverage area 102A of the receiver 101A and a reception coverage area 102B of the receiver 101B partially overlap each other, and four of the transmitters 104 are present in this overlapping area. When a plurality of the transmitters 104 among the four of the transmitters 104 simultaneously perform transmission processing, the receivers 101A and 101B receive signals in which a plurality of radio signals transmitted from the plurality of the transmitters 104 simultaneously performing the transmission processing are superimposed.

Note that the number of the transmitters 104 is given as an example, and may be five or more or three or less. Also in the example illustrated in FIG. 1, in order to simplify the description, the transmitter 104 is not present in an area of the reception coverage area 102A not overlapping the reception coverage area 102B and in an area of the reception coverage area 102B not overlapping the reception coverage area 102A, but the transmitter 104 may be present in these areas.

Furthermore, in the following description, in a case where the receiver 101A and the receiver 101B need not be distinguished from each other such as where matters common to the receiver 101A and the receiver 101B are described, the receiver 101A and the receiver 101B are collectively referred to as a receiver 101.

In the communication system 100, the relative positional relationship between the receivers 101 and the transmitters 104 varies with time. The signals received by the receivers 101 from the transmitters 104 are transmitted to the control station 103 by some other communication means. This communication means normally uses a communication band different from that of the radio signal received from the transmitter 104, but may transmit a signal obtained by amplifying and reproducing the received signal in an analog manner, or may digitally transmit a sample sequence obtained by converting the received signal into a baseband in a digital manner as observed data. As such an environment, for example, a case can be assumed where, in an automatic identification system (AIS), a signal transmitted by a transmitter installed on a ship is received by a receiver installed on a satellite that is an example of a mobile body. In this case, the communication system 100 includes the receiver 101 installed on the satellite and the transmitter 104 installed on the ship. The distance and the relative speed between the transmitters and the receivers vary so that, when many transmitted signals are received, the transmitted signals are received asynchronously while having different values of power, frequency, time, and phase. In particular, in the AIS system, as in Non Patent Literature 1, a plurality of signals transmitted by a plurality of ships are asynchronously superimposed while having different propagation delays depending on the distance between the satellite and the ship. In the present embodiment, the description will be made assuming that each of the receivers 101 is installed on a different satellite, and each of the transmitters 104 is installed on a different ship. Note that although the description will be made for two satellites, the number of satellites may be three or more.

Although it is appropriate that a signal processing scheme described below is primarily performed by the control station 103 in FIG. 1, a specific satellite by inter-satellite communication may aggregate signals received by the receiver 101 installed on another satellite and perform signal processing in the satellite. That is, although it is appropriate that the reception device according to the present embodiment is installed on the control station 103, the reception device may be installed on any of the satellites.

Figure 2:
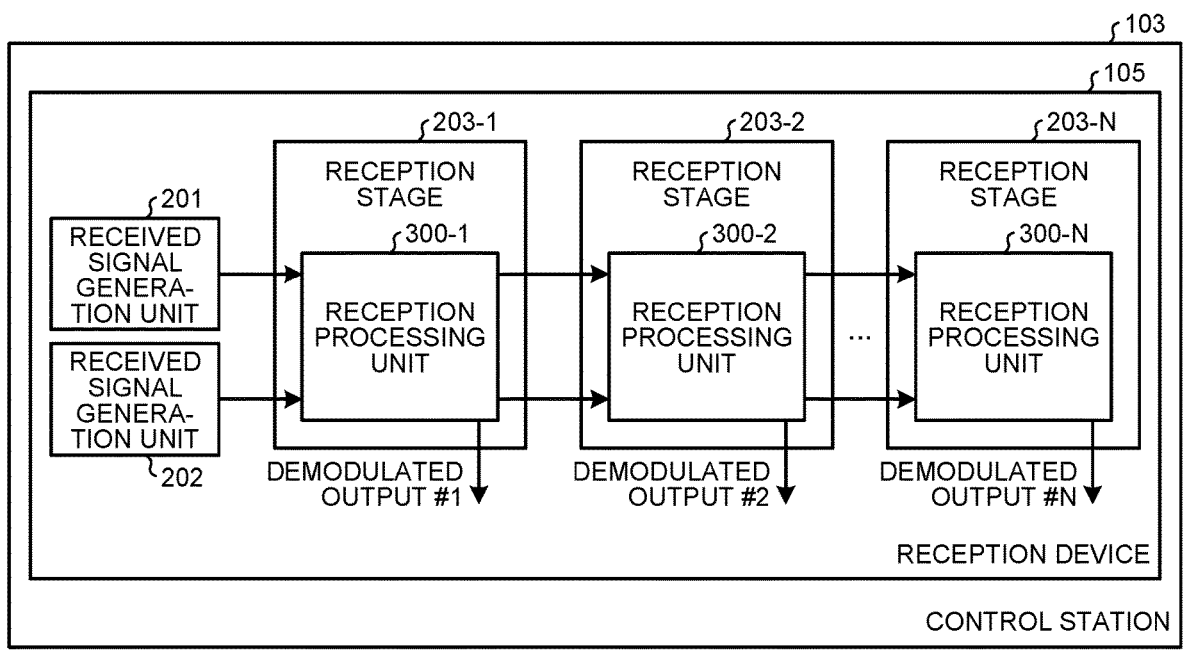
FIG. 2 is a diagram illustrating an example of an overall structure of signal processing performed by the reception device according to the first embodiment.

FIG. 2 is a diagram illustrating an example of an overall structure of signal processing performed by the reception device according to the first embodiment. FIG. 2 illustrates the example of a case where the reception device 105 according to the first embodiment is installed in the control station 103.

Received signal generation units 201 and 202 of the reception device 105 each include a module that is directly connected to a receiving antenna and converts a normal received signal into a baseband signal, or a reception module for observed data observed by a receiving antenna at the physical location described above (such as the satellite). That is, the received signal generation units 201 and 202 generate baseband received signals from radio signals received by the corresponding receiving antennas. The reception device 105 demodulates received data by sequentially performing reception stages 203-1, 203-2, ..., and 203-N (where N is an integer of two or more) on the received signals generated by the received signal generation units 201 and 202. The reception stages are processed by reception processing units 300-1, 300-2, ..., and 300-N. Note that although FIG. 2 illustrates the configuration in which the reception processing unit is provided for each reception stage, the reception stages may be implemented by the reception processing units fewer in number than the number of the reception stages. For example, a single reception processing unit may reinput a processing result in each reception stage and sequentially execute the subsequent reception stages.

In the example illustrated in FIG. 2, the number of the receiving antennas (the number of receiving branches) is two, but may be three or more. Moreover, the configuration of FIG. 2 assumes that one signal is separated in each of the reception stages (reception stages 203-1, 203-2, ..., and 203-N) in which the demodulation processing based on the SIC is performed. The number of stages is arbitrary, and may change depending on the received signal or an observation duration for processing the received signal at a time. It is assumed that a series of the demodulation processing is completed by appropriate end determination described later.

Figure 3:
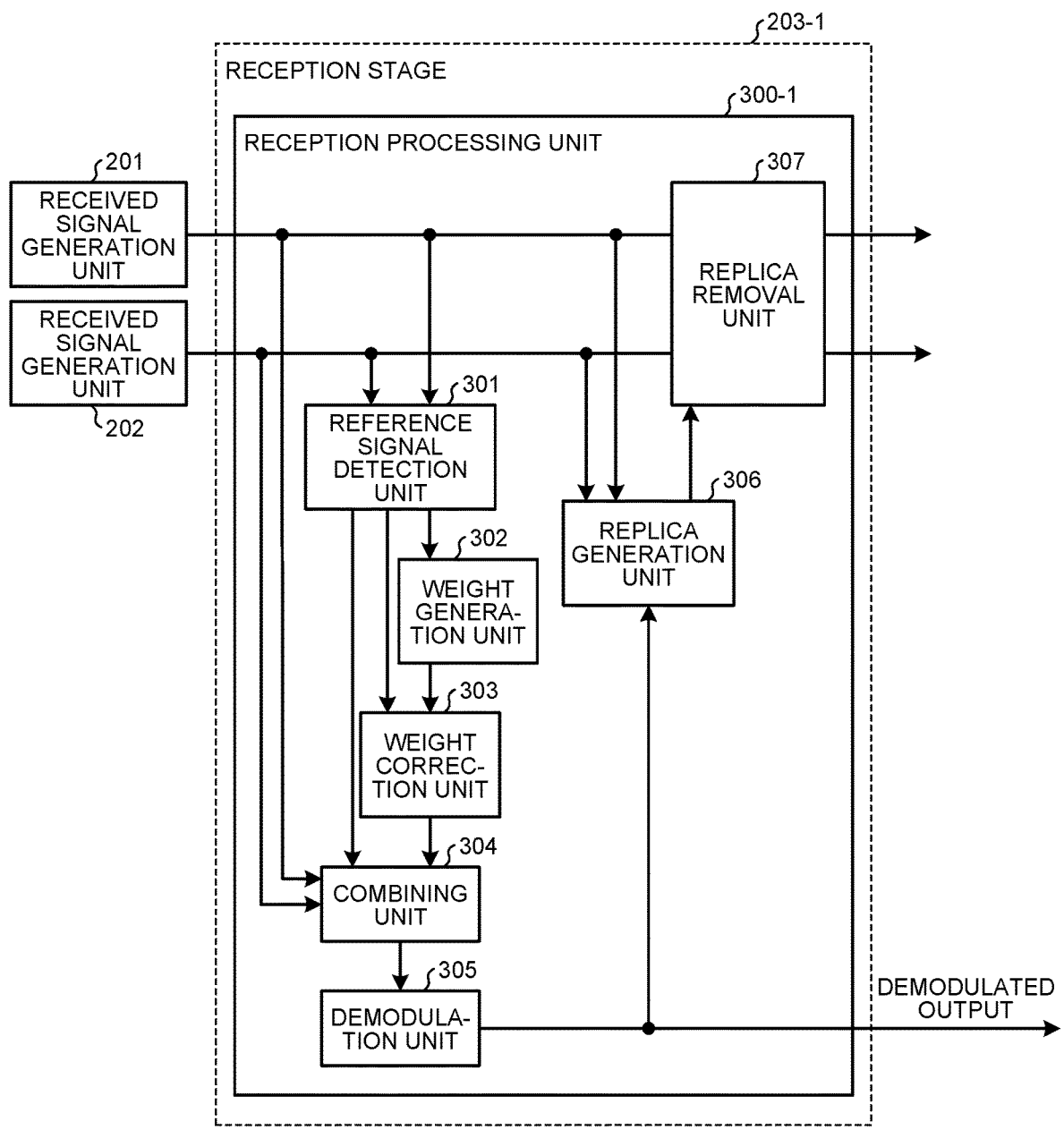
FIG. 3 is a diagram for explaining a configuration of a reception stage executed by the reception device according to the first embodiment.

With reference to FIG. 3, a description will be made of a configuration of each reception stage when the number of the receiving branches is two. FIG. 3 is a diagram for explaining the configuration of the reception stage executed by the reception device 105 according to the first embodiment. As an example, a configuration of the reception stage 203-1 illustrated in FIG. 2 will be described. Note that the other reception stages (reception stages 203-2, ..., and 203-N) have similar configurations.

The reception processing unit 300-1 that implements the reception stage 203-1 includes a reference signal detection unit 301, a weight generation unit 302, a weight correction unit 303, a combining unit 304, a demodulation unit 305, a replica generation unit 306, and a replica removal unit 307.

The reference signal detection unit 301 detects a reference signal included in the received signal input from each of the received signal generation units 201 and 202, and estimates the time of arrival, that is, the reception timing and the frequency of the received signal on the basis of the reference signal detected. Specifically, the reference signal detection unit 301 estimates the time of arrival and the frequency for one of a plurality of signals transmitted from a plurality of the transmitters 104. Here, as with a signal transmitted by a transmitter in the AIS, a known sequence (reference signal) such as a preamble is usually added to a communication wave. Thus, the reference signal detection unit 301 can estimate the time of arrival and the frequency of the received signal by correlating the reference signal and the received signal generated in the reception device 105. Specifically, the above estimation processing can be implemented by, for example, finding sliding correlation in a time direction using a signal that is obtained by multiplying the reference signal by phase rotation patterns assuming a plurality of candidate frequencies.

On the basis of the estimated result of the time of arrival and the frequency of the received signal by the reference signal detection unit 301, the weight generation unit 302 generates a weight that facilitates demodulation of a desired signal (hereinafter also referred to as a desired wave) that is the signal whose time of arrival and frequency are estimated by the reference signal detection unit 301. The weight generation unit 302 generates a weight that improves a received SNR after combining by, for example, calculating phase information of the received signal on the basis of the estimated result by the correlation processing described above, multiplying the received signal of each of the receiving branches by a complex coefficient that matches the phases of the received signals of both of the receiving branches on the basis of the phase information, and combining the received signals. The received SNR is an example of reception quality. Similarly, the weight generation unit 302 may generate a weight that can reduce the influence of interference and noise by reducing the weight of the receiving branch in which a received signal to interference plus noise ratio (SINR) before combining is considered to be low, on the basis of power information at a peak timing of the correlation result and power magnitude at neighboring time and frequency.

The weight correction unit 303 corrects the weight generated by the weight generation unit 302 on the basis of frequency information indicating the frequency of the received signal estimated by the reference signal detection unit 301. Processing of correcting the weight will be described using expressions. When there are two receiving branches and four transmitted signals, received signals $r_0$ and $r_1$ and transmitted signals $s_0$, $s_1$, $s_2$, and $s_3$ have a relationship as expressed by expression (1) excluding the influence of noise.

Expression 1

$$\begin{bmatrix} r_0 \\ r_1 \end{bmatrix} = \begin{bmatrix} h_{00}e^{j\omega_{00}t} & h_{01}e^{j\omega_{01}t} & h_{02}e^{j\omega_{02}t} & h_{03}e^{j\omega_{03}t} \\ h_{10}e^{j\omega_{10}t} & h_{11}e^{j\omega_{11}t} & h_{12}e^{j\omega_{12}t} & h_{13}e^{j\omega_{13}t} \end{bmatrix} \begin{bmatrix} s_0 \\ s_1 \\ s_2 \\ s_3 \end{bmatrix}. \quad (1)$$

In expression (1), a matrix part indicates propagation paths, and "$h_{00}$" to "$h_{13}$" are complex propagation path coefficients between the transmitters and the receivers. Terms of exp( ) represent the influence of Doppler shift different among the receivers. Expression (1) is expressed by matrix and vector as in the following expression (2), which indicates that a received signal is obtained by linear transformation.

Expression 2:

$$r = Hs \quad (2)$$

In the reception device according to the present embodiment, as expressed by the following expression (3), a received signal vector "r" is multiplied by a weight matrix "W" to obtain a combined received signal "y".

Expression 3:

$$y = Wr \quad (3)$$

In the case where the number of the receiving branches is two, the number of weights "w" is two, and thus expansion of expression (3) results in expression (4). Expression 4:

$$y = Wr = w_0 r_0 + w_1 r_1 = (w_0 h_{00} e^{j\omega_{00}t} + w_1 h_{10} e^{j\omega_{10}t}) s_0 + \ldots \quad (4)$$

While the propagation path coefficient "h" is expected to be constant (static) during reception of a single transmit packet, phase rotation occurs due to the Doppler shift, and variation in the received power similar to fading occurs at the time of weight combining. Therefore, in a case where the transmitted signal so is to be received, Doppler terms $\omega_{00}$ and $\omega_{01}$ representing the Doppler shifts for the receiving antennas are estimated, and the static weight is multiplied by an inverse rotation sequence of the Doppler term so that the level of the desired wave after beam combining is stabilized. That is, the weight correction unit 303 generates a new weight matrix W' expressed by expression (5), which is available for use in actual combining.

Expression 5:

$$y = W'r = e^{-j\omega_{00}t} w_0 r_0 + e^{-j\omega_{01}t} w_1 r_1 = (w_0 h_{00} + w_1 h_{10}) s_0 + \ldots \quad (5)$$

According to expression (5), the amplitude of the desired wave so becomes constant when the estimation processing operates correctly, but since different Doppler shifts are applied to the waves other than the desired wave $s_1$, a phenomenon similar to fading occurs so that time-varying interference is included. Therefore, only "$s_0$" is received in this beamforming, and "$s_1$" and subsequent waves are separated by a similar method in the subsequent reception stages. As described above, the weight correction unit 303 applies the Doppler correction term to compensate for the Doppler shift corresponding to the desired wave at the time of signal combining in each reception stage, so that the system as in FIG. 1 can implement SIC processing that sequentially separates the desired wave.

Here, the method of multiplying the received signals by the two Doppler correction terms has been described using expression (5), but it is sufficient that the number of the Doppler correction terms for correction to be actually prepared is (the number of receiving branches−1), that is, it is noted that expression (4) can be rewritten into the following expression (6).

Expression 6:

$$y = Wr = w_0 r_0 + w_1 r_1 = (w_0 h_{00} + w_1 h_{10} e^{j(\omega_{01} - \omega_{00})t}) s_0 e^{j\omega_{00}t} + \ldots \quad (6)$$

In expression (6), when the Doppler term of the received signal serving as a specific reference is factored out and the signal after factoring out is defined as a new "$s_0$", the weight applied to another received signal is set to a relative value with respect to the Doppler term of the received signal serving as the reference, so that the problem of the amplitude rising and falling like fading can be avoided. Since "$s_0$" originally includes a frequency error component due to insufficient stability of an oscillator, the demodulation unit 305 may perform demodulation while correcting the component and the Doppler component of the reference signal for the combined signal using a known algorithm for single branch reception (for example, delay detection, synchronous detection, or a method described in Non Patent Literature 1). When the number of variables to be estimated is reduced as described above, the influence of the frequency estimation error can be reduced with a smaller amount of calculation.

Although the above description does not mention how to specify "$s_0$", it is conceivable to use a method of selecting one having the largest correlation peak in the reference signal detection unit 301.

The combining unit 304 uses the corrected weight matrix W' and performs, for example, combining processing as in expression (5) to acquire a time sample sequence of a single received signal. At this time, in a case where the two receiving branches are considered to have different reception timings due to the distance between the receivers being far or the like, signal combining may be performed by correcting the signal timings at the time of combining on the basis of the reception peak timing obtained by the reference signal detection unit 301. This can avoid imperfection of branch combining (combining of the received signals of the receiving branches) due to not only the frequency error but also the time error, and demodulate the desired wave with higher quality. The combining unit 304 outputs a signal obtained by combining the received signals of the receiving branches using the corrected weight matrix W' to the demodulation unit 305 as a combined received signal.

Moreover, when the reference signal detection unit 301 detects the power, the frequency, the phase, and the timing by the correlation processing, the correlation accuracy may not be obtained in a case where another signal is received with strong power that causes interference at different time and frequency nearby. In this case, estimation may be performed with rough accuracy, and the weight generation unit 302 and the weight correction unit 303 may attempt processing up to demodulation processing using a plurality of weight candidates and Doppler estimation values and repeatedly perform the processing until no error is detected by cyclic redundancy check (CRC) or the like. As a result, even in a case where the estimation accuracy is not sufficient, the number of signals that can be demodulated can be increased by repeatedly attempting calculation for a part with a small accuracy error. The combining unit 304 may similarly perform combining while changing timing candidates.

The demodulation unit 305 demodulates the desired signal from the combined received signal output by the combining unit 304. The demodulation unit 305 performs the demodulation processing on the combined received signal using, for example, delay detection, synchronous detection, or a reception scheme for single antenna as described in Non Patent Literature 1. At this time, if the received signal has an error detection function such as CRC, the demodulation unit 305 outputs an error detection result together with a demodulated bit pattern for one packet.

The replica generation unit 306 calculates the propagation path coefficient, frequency deviation, time of arrival, and the like again by correlation processing or the like using a reliable bit pattern such as one that has been CRC-checked for the received signals of the receiving branches before combining, and generates a replica for removing the influence of the demodulated desired signal from the received signals of the receiving branches. At this time, in a case where the received signal is affected by phase noise or the like of the transmitter 104 and phase variation with time in the packet cannot be ignored, a phase variation following pattern may be simultaneously estimated using the demodulated bit pattern as a reference signal, and the phase variation may be compensated for to improve the accuracy of the replica.

As with the existing technology such as BLAST described above, the replica removal unit 307 cancels the influence of the demodulated desired signal from the received signals of the receiving branches using the replica generated by the replica generation unit 306. Specifically, the replica removal unit 307 subtracts the replica from the input received signals, and generates received signals of the branches from which the component of the demodulated desired signal has been removed.

The received signals generated by the replica removal unit 307 removing the component of the demodulated desired signal are input to the reception processing unit 300-$n$ (n=2, 3, 4, . . . ) that executes processing of the reception stage in a subsequent stage. The reception processing unit 300-$n$ that executes the processing of the reception stage in the subsequent stage executes processing similar to that executed by each unit included in the reception processing unit 300-1 on the received signals input from the reception stage in the preceding stage, demodulates the desired signal included in the input received signals, and removes the component of the demodulated desired signal from the input received signals.

As described above, in the reception device 105 according to the present embodiment, each of the reception processing units 300-1 to 300-N included in the reception stages 203-1 to 203-N targets one desired signal, and performs combining of the received signals of the receiving branches suitable for demodulation of the desired signal by the processing that compensates for the Doppler shift and the time error. In addition, each of the reception processing units 300-1 to 300-N demodulates the desired signal from the combined received signal, removes the demodulated desired signal from the received signal, and outputs the received signal. That is, when the received signals are input, each reception stage performs the combining processing for improving demodulation performance of one desired signal on the received signals of the receiving branches, demodulates the desired signal from the combined received signal, removes the demodulated desired signal from the received signal, and outputs the received signal to the reception stage in the subsequent stage. This can increase the number of signals that can be demodulated when a plurality of receiving branches are available. The present embodiment can implement a reception device capable of improving communication quality in a communication system in which a transmitting antenna and a receiving antenna have a relative positional relationship that varies.

Here, the demodulation unit 305 outputs the demodulated data sequence but may output, in addition to the demodulated data sequence, the calculation result of the CRC, the Doppler frequency or frequency deviation used for demodulation, the time of arrival, the weight information, and the like for use as demodulation supplementary information when the reception device thereafter desires to acquire a signal from the same transmitter.

Second Embodiment

A reception device according to a second embodiment will be described with reference to FIG. 4. A configuration of a communication system to which the reception device according to the second embodiment is applied is similar to that of the first embodiment (see FIG. 1). Also, an overall structure of signal processing performed by the reception device according to the second embodiment is similar to that of the first embodiment (see FIG. 2). However, a configuration of each reception stage of the signal processing, that is, a configuration of a reception processing unit that implements each reception stage is partially different from that of the first embodiment. In the present embodiment, parts that are common to those of the first embodiment will not be described, and parts that are different from those of the first embodiment will be described.

Figure 4:
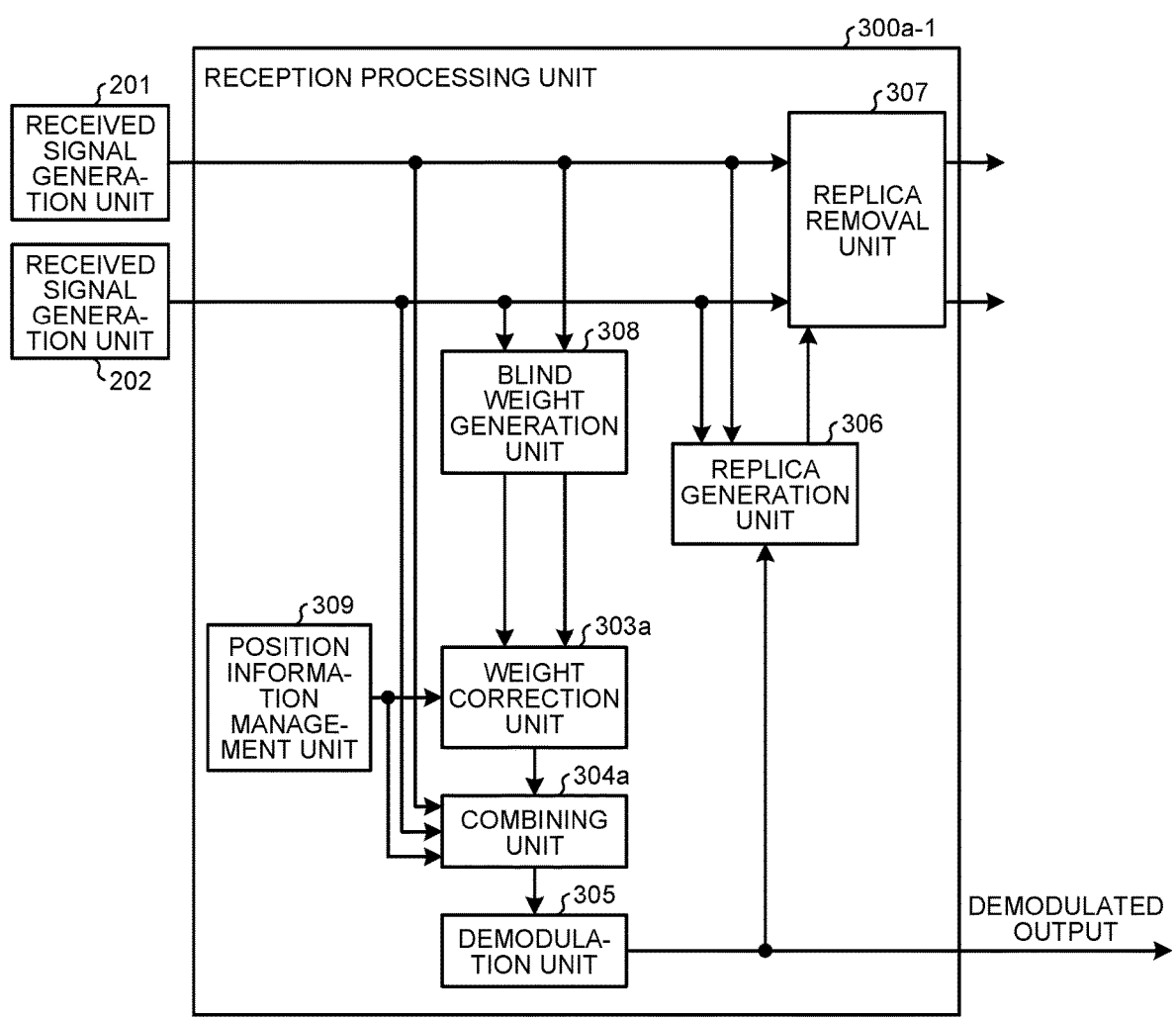
FIG. 4 is a diagram illustrating an example of a configuration of a reception processing unit that implements a first reception stage executed by a reception device according to a second embodiment.

FIG. 4 is a diagram illustrating an example of a configuration of a reception processing unit 300a-1 that implements a first reception stage executed by the reception device according to the second embodiment. Note that a reception processing unit that implements another reception stage has a similar configuration.

The reception processing unit 300a-1 has a configuration in which a blind weight generation unit 308 is included instead of the reference signal detection unit 301 and the weight generation unit 302 of the reception processing unit 300-1 described in the first embodiment, the weight correction unit 303 and the combining unit 304 thereof are replaced with a weight correction unit 303a and a combining unit 304a, respectively, and a position information management unit 309 is added.

In the reception processing unit 300a-1, the blind weight generation unit 308 generates weights. The blind weight generation unit 308 corresponds to the weight generation unit 302 illustrated in FIG. 3, and is a weight generation unit of the reception device according to the second embodiment. The blind weight generation unit 308 generates weights using a blind algorithm such as constant modulus amplitude (CMA) that does not require a reference signal. In a case where CMA is used, the number of receiving branches usually needs to be larger than the number of signals arriving at the same time, and thus three or more receiving branches are needed in many cases. However, even a configuration with two receiving branches as illustrated in FIG. 4 can generate a weight for combining one received signal. As another method, in a case where the number of receiving branches is small such as where the number of receiving branches is two, weights are also two scalar values so that, if the calculation amount is sufficient, an appropriate weight may be generated within a value range assumed from a received SNR combination or phase assumed of an incoming signal. In this case, the received signal does not necessarily need to be connected to the blind weight generation unit 308. Although a possibility of reception with the weight created for the first time is not high, processing from the blind weight generation unit 308 to the demodulation unit 305 may be repeatedly attempted a plurality of times until no error is detected by the CRC.

The position information management unit 309 specifies a possible range of each of a Doppler frequency and a delay time from a positional relationship between a plurality of receiving antennas and an antenna that transmits a desired signal, and gives Doppler frequency and time of arrival information for correction to the weight correction unit 303a and the combining unit 304a. The delay time here means a difference in time of arrival of the desired signal at the receiving antennas. That is, the delay time indicates a difference in timing at which the receiving antennas of the receiving branches receive the desired signal.

For example, in a case where the receiver 101 installed on a satellite receives a signal transmitted by the transmitter 104 in the AIS, the position information management unit 309 estimates the Doppler frequency and the delay time on the basis of orbit information of the satellite and a position or a sea area (such as latitude and longitude information) where the transmitter 104 is present. The weight correction unit 303a and the combining unit 304a perform corresponding weight correction and combining processing on the basis of the estimated results of the Doppler frequency and the delay time so that, for the signal from the position or the sea area where the transmitter 104 is present, the desired wave can be received stably at the time of beam combining, and a possibility of being able to pinpoint and acquire a signal to be acquired increases.

Note that the position where the transmitter is present described above may be, for example, a position where a ship is located as confirmed by a synthetic aperture radar (SAR) image or the like. As a result, in a case where it is not desired to demodulate a signal from a sea area that is not of interest for saving the calculation amount, the ship confirmed by the SAR image can be efficiently collated with the AIS.

The present embodiment has described the blind weight generation and the method of estimating the parameters for compensation based on the position information management, but these two elements need not be applied simultaneously, and it is possible to perform the processing of one of the elements on the basis of the first embodiment or change the processing combination. Moreover, the position information management method may be a hybrid method with the method based on the reference signal in the first embodiment. For example, the position information may be used only when an estimated value of the received SINR obtained from the correlation result of the reference signal is not satisfactory.

Application of the configuration described in the present embodiment can obtain an effect similar to that of the first embodiment. In addition, the weight can be generated without using the reference signal.

Third Embodiment

A reception device according to a third embodiment will be described with reference to FIG. 5. A configuration of a communication system to which the reception device according to the third embodiment is applied is similar to that of the first embodiment (see FIG. 1). In the present embodiment, parts that are common to those of the first embodiment will not be described, and parts that are different from those of the first embodiment will be described.

Figure 5:
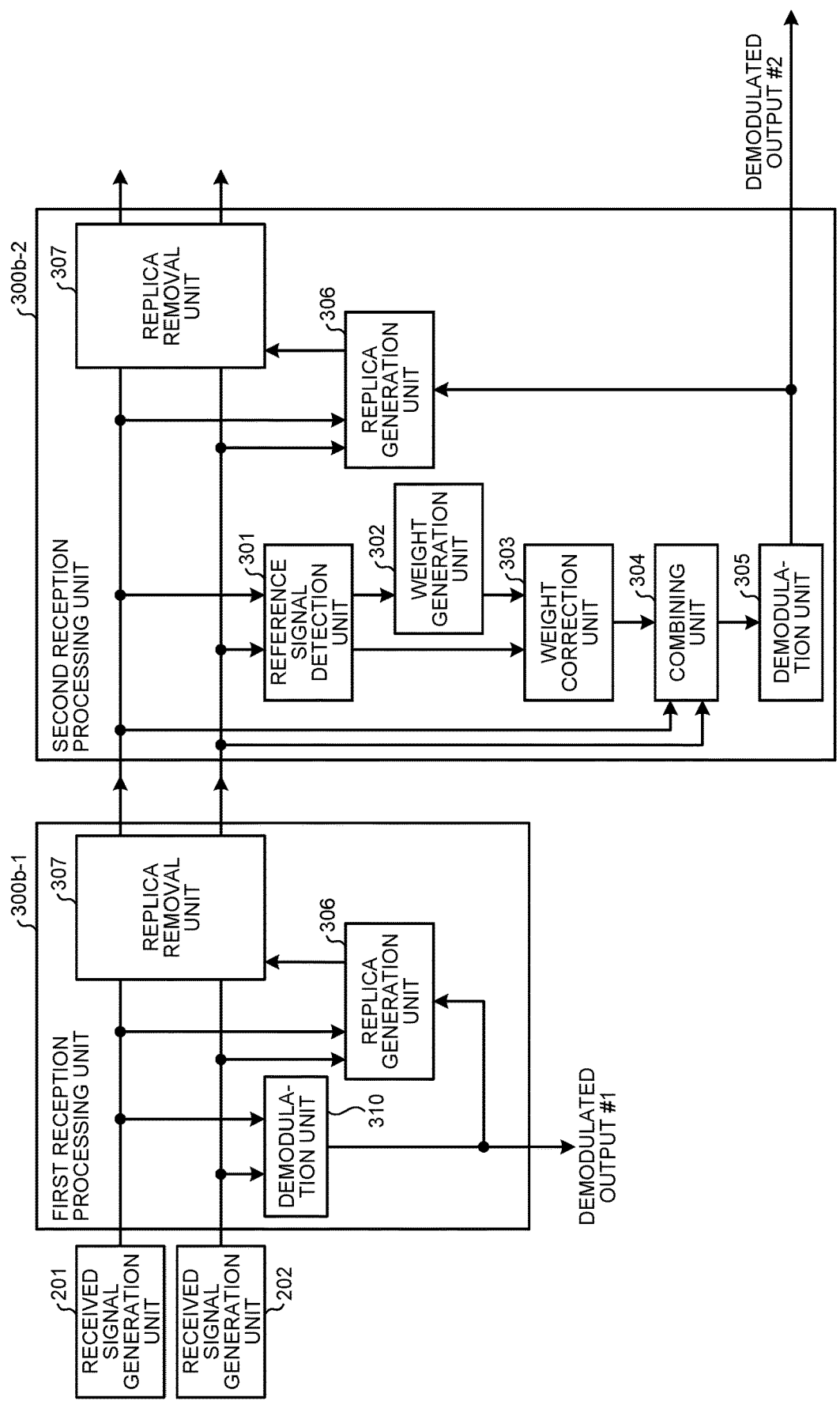
FIG. 5 is a diagram illustrating an example of a configuration of a reception processing unit that implements a reception stage executed by a reception device according to a third embodiment.

FIG. 5 is a diagram illustrating an example of a configuration of a reception processing unit that implements a reception stage executed by the reception device according to the third embodiment. FIG. 5 illustrates a first reception processing unit 300b-1 that implements a first reception stage and a second reception processing unit 300b-2 that implements a second reception stage. The second reception processing unit 300b-2 is similar to the reception processing unit 300-1 illustrated in FIG. 3 described in the first embodiment. The first reception processing unit 300b-1 includes the replica generation unit 306, the replica removal unit 307, and a demodulation unit 310. In the first reception processing unit 300b-1, the demodulation unit 310 demodulates received data without combining received signals of two receiving branches.

There is a case where, upon reception, using the received signal of only one of the receiving branches enables satisfactory demodulation without combining. An example of such a case is where a sufficiently good received SINR is obtained with one receiving branch. In this case, the received signals of the receiving branches need not be combined and demodulated, or rather, if combining is performed to result in a problem with an estimated frequency value or an estimated delay value, a signal that is supposed to be able to be demodulated properly may not be able to be demodulated due to imperfection of the combining. That is, some of the reception stages need not combine the received signals of the receiving branches. In other words, in each reception stage, for example, when there is no received signal of the receiving branch for which the received SINR is larger than a predetermined threshold, the received signals of the receiving branches may be combined and demodulated.

Thus, some of the reception stages need not perform a part of the processing described with reference to FIG. 3. As a result, unnecessary weight calculation can be avoided depending on the situation, and thus demodulation efficiency can be improved. In the present embodiment, the demodulation unit 310 need only perform demodulation by treating each receiving branch as having an individually combined signal, and may thereafter perform processing similar to the processing described above if one receive packet is successfully received without an error being detected.

In addition, generation and removal of a replica need not be performed in some of the reception stages because there may be a case where, for example, the replica removal quality has a problem. That is, generation and removal of the replica need not be performed in the reception stage having a problem with the replica removal quality.

The present embodiment can obtain an effect similar to that of the first embodiment, and can also prevent an unnecessary increase in a processing load related to demodulation of the received data.

Fourth Embodiment

Next, a reception device according to a fourth embodiment will be described. A configuration of a communication system to which the reception device according to the fourth embodiment is applied is similar to that of the first embodiment (see FIG. 1). Also, an overall structure of signal processing performed by the reception device according to the fourth embodiment and a configuration of a reception processing unit that implements each reception stage of the signal processing are similar to those of the first embodiment (see FIGS. 2 and 3).

Figure 6:
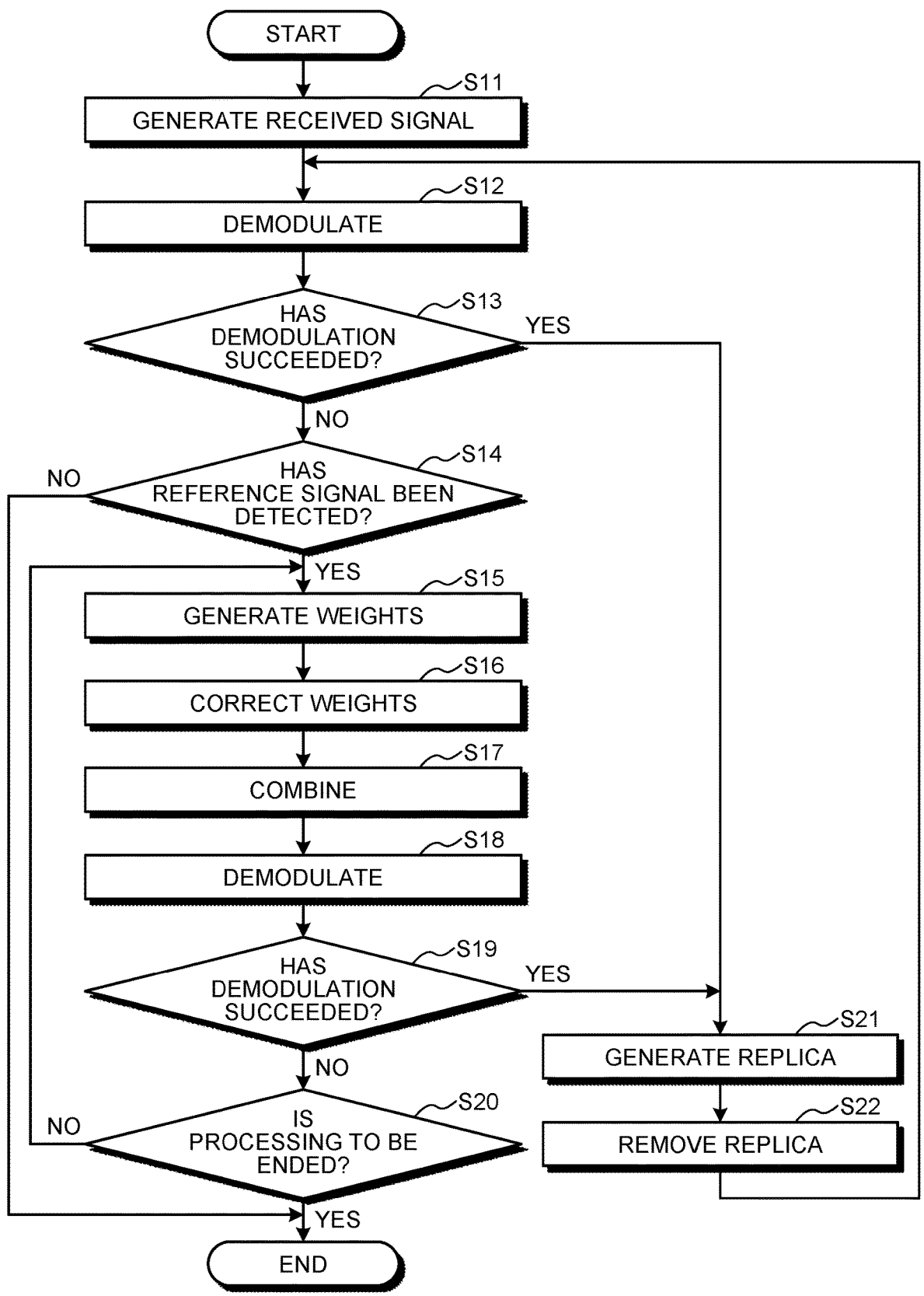
FIG. 6 is a flowchart illustrating an example of operation of a reception device according to a fourth embodiment.

The reception device according to the fourth embodiment performs signal processing according to a flowchart illustrated in FIG. 6. Note that FIG. 6 is a flowchart illustrating an example of operation of the reception device according to the fourth embodiment.

In the reception device 105 according to the fourth embodiment, first, the received signal generation units 201 and 202 described in the first embodiment generate received signals (step S11). At this time, the received signal generation units 201 and 202 perform processing by acquiring a sample sequence with a time width corresponding to one packet or more in terms of time. Next, the reception device 105 demodulates the received signals generated in step S11 (step S12). In step S12, the demodulation unit 305 attempts to demodulate the received signals of the individual receiving branches without combining the received signals in each stage. At this time, each received signal may be input to the demodulation unit 305 via the combining unit 304, or may be directly input to the demodulation unit 305. The reception device 105 then checks whether or not the demodulation has succeeded (step S13), and if the demodulation has succeeded, that is, if the demodulation unit 305 has not detected an error (Yes in step S13), the replica generation unit 306 generates a replica of the demodulated signal (step S21). Note that, in step S13, the reception device 105 determines that the demodulation has succeeded if the received signal of at least one receiving branch has been successfully demodulated. Next, the replica removal unit 307 removes the replica from the received signal (step S22), and the demodulation processing is performed again on the received signal from which the replica has been removed (step S12).

On the other hand, if the demodulation has failed (No in step S13), the reception device 105 checks whether a reference signal can be detected, that is, whether there is a correlation peak of the received power that is sufficient in correlation processing for detecting the reference signal (step S14). If the reference signal has not been detected (No in step S14), the reception device 105 ends the processing. If the reference signal has been detected (Yes in step S14), the weight generation unit 302 generates weights for combining the received signals of the receiving branches (step S15). Next, the weight correction unit 303 corrects the weights generated by the weight generation unit 302 (step S16). The weights are generated and corrected by the method described in the first embodiment. Next, the combining unit 304 combines the received signals of the receiving branches by using the corrected weights (step S17), and the demodulation unit 305 demodulates the combined received signal (step S18).

The reception device 105 then checks whether or not the demodulation in step S18 has succeeded (step S19), and if the demodulation has succeeded (Yes in step S19), the replica generation unit 306 generates a replica of the demodulated signal (step S21), the replica removal unit 307 removes the replica from the received signal (step S22), and then the reception device 105 returns to step S12 to perform the demodulation processing again.

If the demodulation in step S18 has failed (No in step S19), the reception device 105 determines whether to end the processing (step S20). For example, the reception device 105 determines to end the processing if the number of repetitions of steps S15 to S18 described above has reached a predetermined upper limit value, or determines to continue the processing if the number of repetitions has not reached the upper limit value. If determining not to end the processing (No in step S20), the reception device 105 assumes that there is an error in the detected result of the reference signal by the reference signal detection unit 301, and performs the processing of steps S15 to S18 again using values different from the values used the last time or therebefore as estimated values of the time of arrival and frequency of the received signal, thereby attempting demodulation. On the other hand, if determining to end the processing (Yes in step S20), the reception device 105 ends the processing. Note that the upper limit value of the number of repetitions of steps S15 to S18 is set to one or more, and in a case where the upper limit value is one, failure in the demodulation in step S18 immediately ends the processing.

Furthermore, although not illustrated, after the demodulation in step S12 has succeeded and after the demodulation in step S18 has succeeded, the reception device 105 may check whether a sufficient number of demodulated data has been obtained and, if determining that the sufficient number of demodulated data has been obtained, may immediately end the processing without proceeding to the replica generation in step S21.

As described above, the reception device 105 according to the present embodiment first demodulates the received signals of the receiving branches as they are and, if the demodulation has failed, combines the received signals and demodulates the combined received signal. This can obtain an effect similar to that of the first embodiment, that is, an effect of implementing a reception device capable of improving communication quality in a communication system in which a relative positional relationship between a transmitting antenna and a receiving antenna varies, and can also prevent an unnecessary increase in a processing load related to demodulation of received data.

Note that, in the flowchart illustrated in FIG. 6, the processing is ended if the reference signal cannot be detected in step S14, but weights may be generated using a blind algorithm such as CMA. At this time, the position information management unit 309 described in the second embodiment may be included to limit Doppler frequency and delay time, and then the weights may be generated by the blind algorithm.

Figure 7:
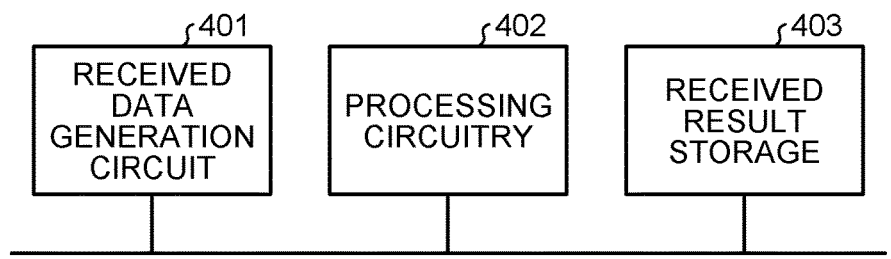
FIG. 7 is a diagram illustrating a first example of a hardware configuration that implements the reception device according to each embodiment.

Next, hardware configurations of the reception device according to the present disclosure will be described. FIG. 7 is a diagram illustrating a first example of the hardware configuration for implementing the reception device according to each embodiment, and FIG. 8 is a diagram illustrating a second example of the hardware configuration for implementing the reception device according to each embodiment.

The reception device according to the present disclosure is implemented by, for example, a received data generation circuit 401, processing circuitry 402, and a received result storage 403 illustrated in FIG. 7. Specifically, the received signal generation units 201 and 202 described in each embodiment are implemented by the received data generation circuit 401. Moreover, the reception processing units 300-1 to 300-N described in the first embodiment, the reception processing unit 300a-1 described in the second embodiment, and the first reception processing unit 300b-1 and the second reception processing unit 300b-2 described in the third embodiment are implemented by the processing circuitry 402. Here, the processing circuitry 402 is a single circuit, a complex circuit, an application specific integrated circuit (ASIC), a field programmable gate array (FPGA), or a circuit obtained by a combination thereof. Note that the received result storage 403 is used to store the demodulated bit sequence obtained in each reception stage executed by the reception device.

Figure 8:
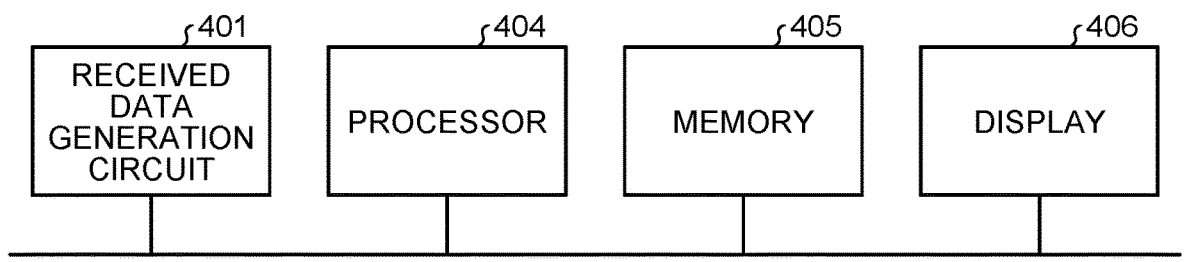
FIG. 8 is a diagram illustrating a second example of a hardware configuration that implements the reception device according to each embodiment.

Alternatively, the reception device according to the present disclosure can be implemented by the received data generation circuit 401, a processor 404 as a control circuit, a memory 405, and a display 406 illustrated in FIG. 8. Here, the processor 404 can be a central processing unit (CPU), a system large scale integration (LSI), or the like, the CPU being also referred to as a central processor, a processing unit, an arithmetic unit, a microprocessor, a microcomputer, or a digital signal processor (DSP). The memory 405 can be a random access memory (RAM), a read only memory (ROM), an erasable programmable read only memory (EPROM), an electrically erasable programmable read only memory (EEPROM (registered trademark)), or the like.

The reception processing units 300-1 to 300-N described in the first embodiment, the reception processing unit 300a-1 described in the second embodiment, and the first reception processing unit 300b-1 and the second reception processing unit 300b-2 described in the third embodiment are implemented when programs for operating as these units stored in the memory 405 are read and executed by the processor 404.

The memory 405 is also used to store the demodulated bit sequence obtained in each reception stage executed by the reception device. The display 406 is used when a processing result by the reception device is displayed.

In a case where the reception processing units 300-1 to 300-N described in the first embodiment, the reception processing unit 300a-1 described in the second embodiment, and the first reception processing unit 300b-1 and the second reception processing unit 300b-2 described in the third embodiment are implemented by the processor 404 and the memory 405, the programs stored in the memory 405 may, for example, be written in a storage medium such as a compact disc (CD)-ROM or a digital versatile disc (DVD)-ROM and then provided to a user or the like, or be provided via a network.

The reception device according to the present disclosure has an effect that the communication quality can be improved by appropriately combining the signals received individually by the plurality of antennas that move.

The configurations illustrated in the above embodiments merely illustrate an example so that another known technique can be combined, the embodiments can be combined together, or the configurations can be partially omitted and/or modified without departing from the scope of the present disclosure.

What is claimed is:

1. A reception device that receives, by a plurality of antennas, a plurality of radio signals transmitted from a plurality of different transmission devices and asynchronously interfering with each other, the reception device comprising:

weight generation circuitry to generate a weight for beamforming in order to improve reception quality of a desired signal, which is one of the plurality of radio signals, on the basis of a reception timing and a frequency of radio signals of the plurality of radio signals received individually by each of the plurality of antennas;

weight correction circuitry to perform correction, on the weight, in order to compensate for a Doppler shift between the radio signals of the plurality of radio signals received individually by each of the plurality of antennas on the basis of the frequency of the radio signals of the plurality of radio signals received individually by each of the plurality of antennas;

combining circuitry to combine the radio signals of the plurality of radio signals received individually by each of the plurality of antennas using the weight obtained after the correction; and reference signal detection circuitry to estimate a reception timing and a frequency of the desired signal on the basis of a reference signal that is a preamble pattern included in the plurality of radio signals and common among the plurality of different transmission devices, wherein the weight generation circuitry generates the weight on the basis of the reception timing and the frequency of the desired signal estimated by the reference signal detection circuitry, and the weight correction circuitry corrects the weight on the basis of the frequency of the desired signal estimated by the reference signal detection circuitry.

2. The reception device according to claim 1, wherein in performing the combining, the combining circuitry compensates for a reception timing error of the desired signal received by each of the plurality of antennas on the basis of the reception timing of the desired signal estimated by the reference signal detection circuitry.

3. The reception device according to claim 1, wherein the weight generation circuitry generates the weight on the basis of the reception timing and the frequency of the radio signals of the plurality of radio signals received by each of the plurality of antennas and received power of the desired signal.

4. The reception device according to claim 1, comprising:
demodulation circuitry to demodulate the desired signal from a combined received signal that is obtained by the combining circuitry combining the radio signals of the plurality of radio signals received individually by each of the plurality of antennas;
replica generation circuitry to generate a replica of the desired signal on the basis of a result of demodulation of the desired signal by the demodulation circuitry; and
replica removal circuitry to subtract the replica from the radio signals of the plurality of radio signals received by each of the plurality of antennas and generate a signal, from which a component of the desired signal is removed, corresponding to each of the plurality of antennas.

5. The reception device according to claim 4, wherein the reception device repeatedly performs, on the signal obtained after the component of the desired signal is removed by the replica removal circuitry, processing in which the weight generation circuitry generates a weight, processing in which the weight correction circuitry corrects the weight, processing in which the combining circuitry combines signals, processing in which the demodulation circuitry demodulates a desired signal, processing in which the replica generation circuitry generates a replica, and processing in which the replica removal circuitry generates a signal from which a component of the desired signal is removed.

6. The reception device according to claim 1, wherein the combining circuitry performs the combining in a case where there is no signal satisfying predetermined reception quality among the radio signals of the plurality of radio signals received individually by each of the plurality of antennas.

7. The reception device according to claim 1, wherein the combining circuitry performs the combining in a case where there is no signal successfully demodulated among the radio signals of the plurality of radio signals received individually by each of the plurality of antennas.

8. A communication system comprising:
the reception device according to claim 1; and
a plurality of transmission devices to each transmit radio signals among the plurality of radio signals, wherein
the plurality of antennas that receive radio signals among the plurality of radio signals transmitted from the plurality of transmission devices are installed on different mobile bodies.

9. A reception method by a reception device that receives, by a plurality of antennas, a plurality of radio signals transmitted from a plurality of different transmission devices and asynchronously interfering with each other, the reception method comprising:
generating a weight for beamforming in order to improve reception quality of a desired signal, which is one of the plurality of radio signals, on the basis of a reception timing and a frequency of radio signals of the plurality of radio signals received individually by each of the plurality of antennas;
performing correction, on the weight, in order to compensate for a Doppler shift between the radio signals of the plurality of radio signals received individually by each of the plurality of antennas on the basis of the frequency of the radio signals of the plurality of radio signals received individually by each of the plurality of antennas;
combining the radio signals of the plurality of radio signals received individually by each of the plurality of antennas using the weight obtained after the correction; and
estimating a reception timing and a frequency of the desired signal on the basis of a reference signal that is a preamble pattern included in the plurality of radio signals and common among the plurality of different transmission devices, wherein
the generating includes generating the weight on the basis of the reception timing and the frequency of the desired signal estimated in the estimating, and
the performing includes correcting the weight on the basis of the frequency of the desired signal estimated in the estimating.

10. A control circuit that controls a reception device that receives, by a plurality of antennas, a plurality of radio signals transmitted from a plurality of different transmission devices and asynchronously interfering with each other, the control circuit causing the reception device to execute:
generating a weight for beamforming in order to improve reception quality of a desired signal, which is one of the plurality of radio signals, on the basis of a reception timing and a frequency of radio signals of the plurality of radio signals received individually by each of the plurality of antennas;
performing correction, on the weight, in order to compensate for a Doppler shift between the radio signals of the plurality of radio signals received individually by each of the plurality of antennas on the basis of the frequency of the the radio signals of the plurality of radio signals received individually by each of the plurality of antennas;
combining the radio signals of the plurality of radio signals received individually by each of the plurality of antennas using the weight obtained after the correction; and
estimating a reception timing and a frequency of the desired signal on the basis of a reference signal that is a preamble pattern included in the plurality of radio signals and common among the plurality of different transmission devices, wherein
the generating includes generating the weight on the basis of the reception timing and the frequency of the desired signal estimated in the estimating, and
the performing includes correcting the weight on the basis of the frequency of the desired signal estimated in the estimating.

* * * * *